(12) United States Patent
Kuri (10) Patent No.: US 10,670,856 B2
(45) Date of Patent: Jun. 2, 2020

(54) OPTICAL MODULE AND METHOD OF DRIVING OPTICAL MODULE

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/919,631

(22) Filed: Mar. 13, 2018

(65) Prior Publication Data

US 2018/0284422 A1 Oct. 4, 2018

(30) Foreign Application Priority Data

Mar. 28, 2017 (JP) ................................. 2017-063020

(51) Int. Cl.
| | |
|---|---|
| G02B 26/00 | (2006.01) |
| G01J 3/26 | (2006.01) |
| G01J 3/02 | (2006.01) |
| G01J 3/06 | (2006.01) |
| G02B 5/28 | (2006.01) |

(52) U.S. Cl.
CPC ............ *G02B 26/001* (2013.01); *G01J 3/027* (2013.01); *G01J 3/06* (2013.01); *G01J 3/26* (2013.01); *G02B 5/284* (2013.01); *G01J 2003/064* (2013.01)

(58) Field of Classification Search
CPC ....... G02B 26/001; G02B 5/284; G01J 3/027; G01J 3/06; G01J 3/26; G01J 2003/064

USPC ....................................................... 359/200.6
See application file for complete search history.

(56) References Cited

U.S. PATENT DOCUMENTS

2014/0009761 A1   1/2014  Nishimura

FOREIGN PATENT DOCUMENTS

| EP | 2423729 A1 | 2/2012 |
| EP | 2634550 A1 | 9/2013 |
| JP | 2011-250572 A | 12/2011 |
| JP | 2013-238755 A | 11/2013 |
| WO | WO-2008-142417 A2 | 11/2008 |

OTHER PUBLICATIONS

Extended European Search Report for Patent Application No. EP 18163589.7, dated Jul. 24, 2018 (9 pages).

*Primary Examiner* — Wen Huang
(74) *Attorney, Agent, or Firm* — Harness, Dickey & Pierce, P.L.C.

(57) ABSTRACT

An optical module includes a variable wavelength interference filter provided with a pair of reflecting films, and an electrostatic actuator configured to change a gap dimension between the pair of reflecting films, a driver configured to apply a periodic drive voltage to the electrostatic actuator, a gap detector configured to detect a gap dimension between the pair of reflecting films, and a light receiver configured to receive light from the variable wavelength interference filter. The light reception signal from the light receiver is detected at a predetermined timing from a detection timing of one of a maximum value and a minimum value of the gap dimension detected by the gap detector.

15 Claims, 5 Drawing Sheets

OPTICAL MODULE AND METHOD OF DRIVING OPTICAL MODULE

BACKGROUND

1. Technical Field

The present invention relates to an optical module and a method of driving the optical module.

2. Related Art

A known optical module is provided with a variable wavelength interference filter for outputting light with a predetermined wavelength from incident light (see, e.g., JP-A-2013-238755).

The optical module of JP-A-2013-238755 is provided with a pair of reflecting films opposed to each other, and an electrostatic actuator for varying a gap dimension between the pair of reflecting films. In such an optical module, it is possible to vary the dimension between the reflecting films using an electrostatic actuator having a simple configuration with a pair of electrodes disposed so as to be opposed to each other, and it becomes possible to change the wavelength of the light to be transmitted through the variable wavelength interference filter.

The optical module of JP-A-2013-238755 applies a preset bias voltage to the electrostatic actuator to thereby keep the dimension between the reflecting films at a predetermined dimension, and then detects the light intensity of the light output from the variable wavelength interference filter. Further, the optical module switches the bias voltage, to thereby detect the light intensities of the light with the respective wavelengths.

In such an optical module, it is desired to lower the voltage to be applied to the electrostatic actuator for varying the dimension between the reflecting films to thereby reduce the current consumption and the power consumption.

SUMMARY

An advantage of some aspects of the invention is to provide an optical module and a method of driving the optical module each capable of reducing the current consumption and the power consumption.

An optical module according to an application example of the invention includes a variable wavelength interference filter provided with a pair of reflecting films, and an electrostatic actuator configured to change a gap dimension between the pair of reflecting films, a driver (drive circuit) configured to apply a periodic drive voltage to the electrostatic actuator, a gap detector (sensor circuit) configured to detect a gap dimension between the pair of reflecting films, and a light receiver (photodiode) configured to receive light output from the variable wavelength interference filter. The light reception signal from the light receiver is detected at a predetermined timing from a detection timing of one of a maximum value and a minimum value of the gap dimension detected by the gap detector.

According to this application example, the variable wavelength interference filter can be driven to resonate by applying the periodic drive voltage to the electrostatic actuator.

In this case, it is possible to displace the variable wavelength interference filter using not only the force generated by the electrostatic actuator, but also the restoring force for biasing the variable wavelength interference filter once deformed to return to the original shape. Therefore, it is possible to vary the gap dimension in the predetermined range with a lower voltage compared to the case of displacing the variable wavelength interference filter only with the force generated by the electrostatic actuator.

Further, by detecting the light reception signal at the predetermined timing from the detection timing of the maximum value or the minimum value of the gap dimension during the resonance, it is possible to measure the light intensity of the light with each wavelength.

As described above, according to this application example, the light intensity of the light with each wavelength can be measured with a low voltage, and thus, the current consumption and the power consumption can be reduced.

In the optical module according to the application example of the invention, it is preferable that the voltage value of the periodic drive voltage is not higher than (less than or equal to) 5 V.

For example, in the gap detector and the light receiver, in general, a voltage equal to or lower than 5 V is used.

In the application example with the configuration described above, since the voltage value of the periodic drive voltage is equal to or lower than 5 V, the voltage used in, for example, the gap detector and the light receiver can be used as the periodic drive voltage without being stepped up. Therefore, there is no need to provide a step-up circuit or the like, and therefore, the optical module can be miniaturized.

In the optical module according to the application example of the invention, it is preferable that the driver is capable of changing the period of the periodic drive voltage, and varies the period in a range from 80% to 120% with respect to a characteristic period of a movable section (movable span) of a movable substrate of the variable wavelength interference filter, and then locks the period when the gap detector has detected one of the maximum value that is not smaller than a first value and the minimum value that is not larger than a second value for a predetermined number of times.

According to the application example with this configuration, it is possible to set the period of the periodic drive voltage to the period with which the variable wavelength interference filter can be driven to resonate based on the actual measured value. Therefore, even in the case in which the characteristic period of the variable wavelength interference filter varies in accordance with, for example, the usage environment, it is possible to drive the variable wavelength interference filter to resonate with accuracy.

Further, since the search range of the period with which the variable wavelength interference filter can be driven to resonate is 80% through 120% of the characteristic period of the variable wavelength interference filter, it is possible to prevent searching from the period low in probability that the variable wavelength interference filter can be driven to resonate. Therefore, the average time used for the search of the period can be reduced.

A method of driving an optical module according to an application example of the invention is a method of driving the optical module provided with a variable wavelength interference filter provided with a pair of reflecting films, and an electrostatic actuator configured to change a gap dimension between the pair of reflecting films, and a light receiver configured to receive light output from the variable wavelength interference filter, including the steps of applying a periodic drive voltage to the electrostatic actuator, and detecting a light reception signal from the light receiver at a predetermined timing from a timing at which the gap dimension between the pair of reflecting films takes one of a maximum value and a minimum value.

According to this application example, the light intensity of the light with each wavelength can be detected with a low voltage, and thus, the current consumption and the power consumption can be reduced.

BRIEF DESCRIPTION OF THE DRAWINGS

Embodiments of the invention will be described with reference to the accompanying drawings, wherein like numbers reference like elements.

DESCRIPTION OF AN EXEMPLARY EMBODIMENT

Embodiment

An embodiment according to the invention will hereinafter be described based on the accompanying drawings.
Configuration of Optical Device FIG. 1 is a block diagram showing a schematic configuration of an optical device 1 of the embodiment according to the invention.

The optical device 1 is an example of an optical module, and is a device for measuring the light intensities of light with respective wavelengths in the measurement target light reflected by, for example, a measurement object X. It should be noted that although in the present embodiment, the example of measuring the measurement target light reflected by the measurement object X is described, in the case of using a light emitting body such as a liquid crystal panel, it is possible to use the light emitted from the light emitting body as the measurement target light.

Figure 1:
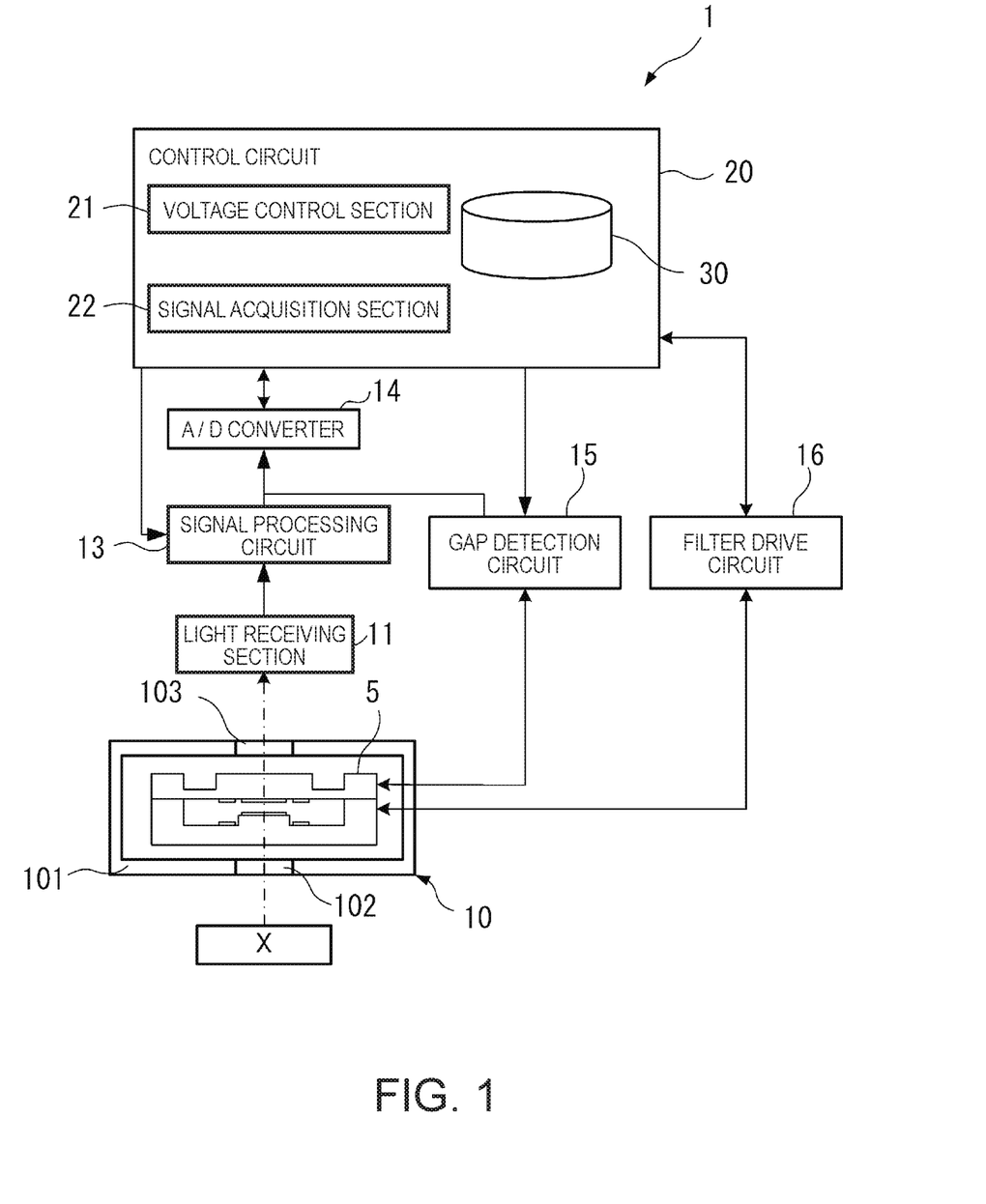
FIG. 1 is a block diagram showing a schematic configuration of an optical device according to an embodiment of the invention.

Further, as shown in FIG. 1, the optical device 1 is provided with an optical filter device 10, a light receiver 11, a signal processing circuit 13, an A/D converter 14, a gap detection circuit 15, a filter drive circuit 16, and a control circuit 20.

The light receiver 11 receives the light transmitted through the variable wavelength interference filter 5 described later provided to the optical filter device 10, and then outputs a light reception signal (an electrical current) corresponding to the light intensity of the light thus received. As the light receiver 11, there can be illustrated a photodiode and similar device that can be used to output a signal based on received light intensity.

The signal processing circuit 13 is provided with an I-V converter and an amplifier circuit. The I-V converter converts the light reception signal input from the light receiver 11 into a voltage signal, and then outputs the voltage signal. The I-V converter is provided with, for example, an operational amplifier, a resistor element, a capacitor and so on, and in order to realize high-speed measurement, the feedback resistance and the feedback capacitance are set as small as possible taking the SN ratio and ensuring stable drive into consideration. The amplifier circuit amplifies the voltage signal output from the I-V converter to output the result to the A/D converter 14. The amplifier circuit is provided with, for example, an inverting amplifier circuit or a noninverting amplifier circuit using an operational amplifier.

The gap detection circuit 15 is an example of a gap detector, and detects the capacitance between the reflecting films 54, 55 (see FIG. 2 and FIG. 3) described later of the variable wavelength interference filter 5, and then outputs a detection signal (a detection value) to the A/D converter 14. The gap detection circuit 15 is constituted by, for example, a switched capacitor circuit. Here, since the capacitance between the reflecting films 54, 55 has correlation with the gap dimension between the reflecting films 54, 55, the gap detection circuit 15 detects the capacitance between the reflecting films 54, 55 to thereby detect the gap dimension.

The A/D converter 14 converts the light reception signal, which has been output from the signal processing circuit 13, and the detection signal, which has been output from the gap detection circuit 15, into digital signals, and then outputs the digital signals to the control circuit 20.

It should be noted that the A/D converter 14 can also be incorporated in the control circuit 20.

The filter drive circuit 16 is an example of a driver, and applies the periodic drive voltage (a voltage output with a predetermined period) to an electrostatic actuator 56, described later, of the variable wavelength interference filter 5 based on the control by the control circuit 20. The filter drive circuit 16 includes an inverter circuit and so on, and is configured so as to be able to change the period (the frequency) of the periodic drive voltage.
Configuration of Optical Filter Device As shown in FIG. 1, the optical filter device 10 is provided with a housing 101, and the variable wavelength interference filter 5 housed inside the housing 101.

The housing 101 is a box-like member for housing the variable wavelength interference filter 5, and has an internal space kept in reduced pressure (e.g., vacuum).

The housing 101 has an incident window 102 for making measurement light enter the housing 101 and an exit window 103 for transmitting the light having been transmitted through the variable wavelength interference filter 5, wherein the incident window 102 and the exit window 103 are located on the optical axis of the measurement light from the measurement object X. The incident window 102 and the exit window 103 are each closed by a transparent member such as glass.
Configuration of Variable Wavelength Interference Filter Next, the variable wavelength interference filter 5 housed in the housing 101 of the optical filter device 10 will be described.

Figure 2:
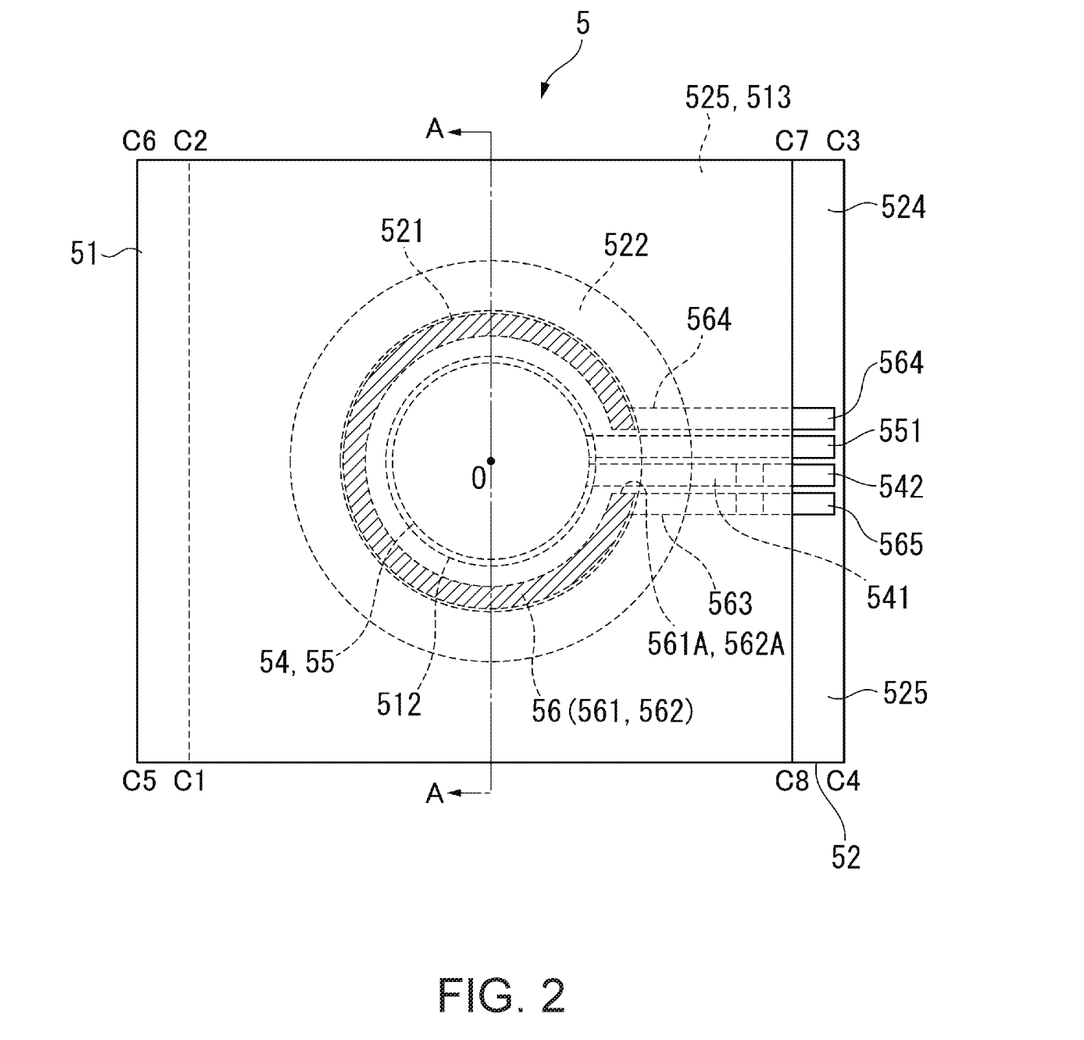
FIG. 2 is a plan view showing a schematic configuration of a variable wavelength interference filter according to the embodiment.
Figure 3:
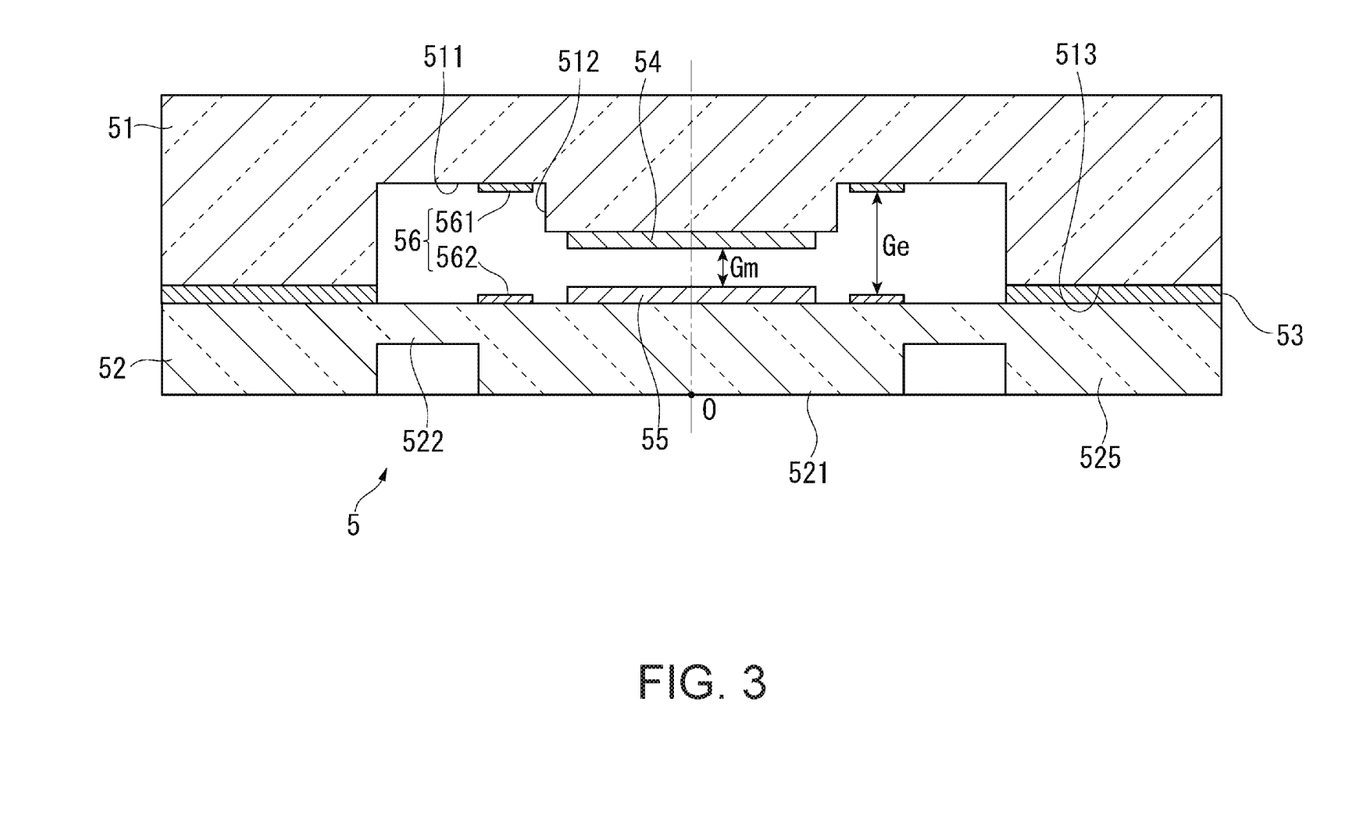
FIG. 3 is a cross-sectional view showing the schematic configuration of the variable wavelength interference filter according to the embodiment.

FIG. 2 is a plan view showing a schematic configuration of the variable wavelength interference filter 5. FIG. 3 is a cross-sectional view showing the schematic configuration of the variable wavelength interference filter 5 obtained by cutting FIG. 2 along the line A-A.

As shown in FIG. 2, the variable wavelength interference filter 5 is an optical member having, for example, a rectangular plate shape.

As shown in, for example, FIG. 3, the variable wavelength interference filter 5 is provided with a stationary substrate 51 and a movable substrate 52. The stationary substrate 51 and the movable substrate 52 bonded to each other with a bonding film 53 such as a plasma-polymerized film consisting primarily of siloxane to thereby be integrally configured.

The stationary substrate 51 is provided with a stationary reflecting film 54 constituting a first reflecting film, and the movable substrate 52 is provided with a movable reflecting film 55 constituting a second reflecting film, wherein the stationary reflecting film 54 and the movable film 55 are disposed so as to be opposed to each other via an inter-reflecting film gap Gm. Further, the variable wavelength interference filter 5 is provided with the electrostatic actuator 56 (a hatched part shown in FIG. 2) for changing the gap dimension of the inter-reflecting film gap Gm.

Hereinafter, a configuration of each of the constituents will be described in detail.

Configuration of Stationary Substrate

The stationary substrate 51 is provided with an electrode arrangement groove 511 and a reflecting film installation section 512 each formed by, for example, etching on a surface opposed to the movable substrate 52. The stationary substrate 51 is formed to have the thickness dimension larger than that of, for example, the movable substrate 52, and thus, the deflection of the stationary substrate 51 caused when the electrostatic actuator 56 applies electrostatic attractive force is suppressed. Further, one end side (e.g., the side C5-C6 in FIG. 2) of the stationary substrate 51 projects from one end side (the side C1-C2) of the movable substrate 52.

The electrode arrangement groove 511 is formed to have a roughly ring-like shape centered on a predetermined filter center point O in a planar view (hereinafter referred to simply as a planar view) of the stationary substrate 51 viewed along the substrate thickness direction. The reflecting film installation section 512 is formed so as to protrude toward the movable substrate 52 from the central portion of the electrode arrangement groove 511. Further, on the groove bottom surface of the electrode arrangement groove 511, there is disposed a stationary electrode 561 constituting the electrostatic actuator 56, and on the protrusion tip surface of the reflecting film installation section 512, there is disposed the stationary reflecting film 54.

Further, the stationary substrate 51 is provided with an electrode extraction groove (not shown) extending from the electrode arrangement groove 511 toward the side C3-C4.

In the groove bottom surface of the electrode arrangement groove 511, the stationary electrode 561 is disposed in an area opposed to the movable electrode 562 of a movable section 521 described later. The stationary electrode 561 is formed to have, for example, a roughly ring-like shape, and is provided with a cutout part 561A for communicating the inside and the outside of the ring in a part adjacent to the side C3-C4.

Further, to the stationary electrode 561, there is connected a first extraction electrode 563 extending along the electrode extraction groove toward the side C3-C4. The first extraction electrode 563 is connected to a first connection electrode 565 disposed on the movable substrate 52 side in the electrode extraction groove.

It should be noted that although in the present embodiment, there is shown a configuration provided with the single stationary electrode 561, it is also possible to adopt a configuration (a dual electrode configuration) provided with, for example, two concentric electrodes centered on the filter center point O.

As shown in FIG. 3, the stationary reflecting film is disposed on a tip surface of the reflecting film installation section 512. As the stationary reflecting film 54, a metal film made of Ag or the like, or an alloy film made of an Ag alloy or the like, for example, can be used. Further, to the stationary reflecting film 54, there is connected a third extraction electrode 541 disposed so as to extend to the electrode extraction groove through the cutout part 561A of the stationary electrode 561. The third extraction electrode 541 is connected to a third connection electrode 542 disposed on the movable substrate 52 side in the electrode extraction groove.

It should be noted that a dielectric multilayer film with a high refractive index layer made of, for example, $TiO_2$, and a low refractive index layer made of, for example, $SiO_2$ can also be used as the stationary reflecting film 54. In this case, it is sufficient to stack a conductive film such as a metal film (or an alloy film) on the dielectric multilayer film, and to connect the third extraction electrode 541 to the conductive film.

Further, in the surface opposed to the movable substrate 52 of the stationary substrate 51, a part on which the electrode arrangement groove 511, the reflecting film installation section 512, or the electrode extraction groove is not formed by etching constitutes a bonding section 513 to be bonded to the movable substrate 52.

Configuration of Movable Substrate

The movable substrate 52 is provided with the movable section 521 (a movable span/movable disc) having a circular shape centered on the filter center point O, a holding section 522 (flexure) coaxial with the movable section 521 and for holding the movable section 521, and a substrate peripheral section 525 (periphery) disposed outside the holding section 522 in the planar view shown in FIG. 2. Further, one end side (a side C3-C4 side) of the movable substrate 52 projects outward from the side C7-C8 of the stationary substrate 51 to form an electric component mounting section 524.

The movable section 521 is formed to have a thickness dimension larger than that of the holding section 522, and is formed in the present embodiment, for example, to have the same thickness dimension as that of the movable substrate 52. The movable section 521 is formed to have a diameter larger than at least the diameter of the outer peripheral edge of the reflecting film installation section 512 in the planar view. Further, the movable section 521 is provided with the movable electrode 562 and the movable reflecting film 55.

The movable electrode 562 is opposed to the stationary electrode 561 via the inter-electrode gap Ge, and is formed to have a ring-like shape, which is the same shape as that of the stationary electrode 561. The movable electrode 562 is also provided with a cutout part 562A (a cutout) in a part on the side C7-C8 side similarly to the stationary electrode 561.

Further, to the movable electrode 562, there is connected a second extraction electrode 564 disposed so as to extend from the outer peripheral edge of the movable electrode 562 to the electric component mounting section 524 through an area opposed to the electrode extraction groove of the stationary substrate 51. To the second extraction electrode 564, there is connected wiring such as an FPC (flexible printed circuits) or a leading wire in the electric component mounting section 524, and thus, the second extraction electrode 564 is connected to the filter drive circuit 16.

The movable reflecting film 55 is disposed at the central portion of the movable section 521 so as to be opposed to the stationary reflecting film 54 via the inter-reflecting film gap Gm. As the movable reflecting film 55, it is possible to use a reflecting film having the same configuration as that of the stationary reflecting film 54 described above.

A fourth extraction electrode 551 is connected to the movable reflecting film 55. The fourth extraction electrode 551 passes through the cutout part 562A of the movable electrode 562 to an area opposed to the electrode extraction groove, and then extends to the electric component mounting section 524. To the fourth extraction electrode 551, there is connected wiring such as an FPC (flexible printed circuits) or a leading wire in the electric component mounting section 524, and thus, the fourth extraction electrode 551 is connected to the gap detection circuit 15.

Further, the movable substrate 52 is provided with the first connection electrode 565 and the third connection electrode 542 disposed continuously from an area opposed to an electrode opposed groove to the electric component mounting section 524.

The first connection electrode 565 is connected to the first extraction electrode 563 disposed so as to extend to the electrode opposed groove via, for example, a bump electrode. Further, to the first connection electrode 565, there is connected wiring such as an FPC in the electric component mounting section 524, and thus, the first connection electrode 565 is connected to the filter drive circuit 16.

The third connection electrode 542 is connected to the third extraction electrode 541 disposed so as to extend to the electrode opposed groove via, for example, a bump electrode. Further, to the third connection electrode 542, there is connected wiring such as an FPC in the electric component mounting section 524, and thus, the third connection electrode 542 is connected to the gap detection circuit 15.

It should be noted that although in the present embodiment, there is shown the example in which the gap dimension of the inter-electrode gap Ge is larger than the gap dimension of the inter-reflecting film gap Gm as described above, this example is not a limitation. For example, depending on the wavelength band of the measurement target light, it is also possible to adopt a configuration in which the gap dimension of the inter-reflecting film gap Gm becomes larger than the gap dimension of the inter-electrode gap Ge.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 along the film thickness direction of the movable reflecting film 55 with weak electrostatic attractive force. Therefore, when a voltage is applied to the electrostatic actuator 56, the movable section 521 vibrates centering on the position where the electrostatic attractive force caused by the electrostatic actuator 56 and the spring force (restoring force) of the holding section 522 are balanced out each other.

It should be noted that although in the present embodiment the holding section 522 having a diaphragm shape is shown as an example, this is not a limitation, but it is also possible to adopt a configuration of, for example, providing beam-like holding sections arranged at regular angular intervals centering on the filter center point O.

The substrate peripheral section 525 is disposed outside the holding section 522 in the planar view. The substrate peripheral section 525 is bonded to the stationary substrate 51.

In such a variable wavelength interference filter 5 as described above, the filter drive circuit 16 repeatedly applies the voltage between the stationary electrode 561 and the movable electrode 562 with the period (characteristic period) of the characteristic vibration of the movable section 521 to thereby resonate the movable section 521. Thus, it becomes possible to continuously vary the gap dimension of the inter-reflecting film gap Gm in a predetermined range.

Further, it becomes possible to detect the capacitance (the gap dimension) between the stationary reflecting film 54 and the movable reflecting film 55 to output the detection signal (detection value) to the control circuit 20 using the gap detection circuit 15.

Configuration of Control Circuit

Referring back to FIG. 1, the control circuit 20 of the optical device 1 will be described.

The control circuit 20 is configured by combining, for example, a central processing unit (CPU), a memory, and so on with each other, and controls the overall operation of the optical device 1. As shown in FIG. 1, the control device 20 is provided with a voltage control section 21 and a signal acquisition section 22 (signal acquirer or signal circuit).

Further, the control circuit 20 is provided with a storage section 30, and the storage section 30 stores data representing the characteristic period of the movable section 521 of the variable wavelength interference filter 5, data representing a relationship between the inter-reflecting film gap Gm and a transparent wavelength, and so on. The storage section 30 includes, for example, a memory such as a flash memory.

The voltage control section 21 controls the filter drive circuit 16 to apply the voltage between the stationary electrode 561 and the movable electrode 562 of the electrostatic actuator 56. In the present embodiment, the voltage control section 21 applies the periodic drive voltage to the electrostatic actuator 56 to resonate the movable section 521 of the variable wavelength interference filter 5.

The signal acquisition section 22 controls the gap detection circuit 15 to obtain the detection signal output from the gap detection circuit 15. Further, the signal acquisition section 22 controls the signal processing circuit 13 to obtain the light reception signal output from the light receiver 11.

Method of Driving Optical Device

Next, a method of driving the optical device 1 described above will be described based on the drawings.

Figure 4:
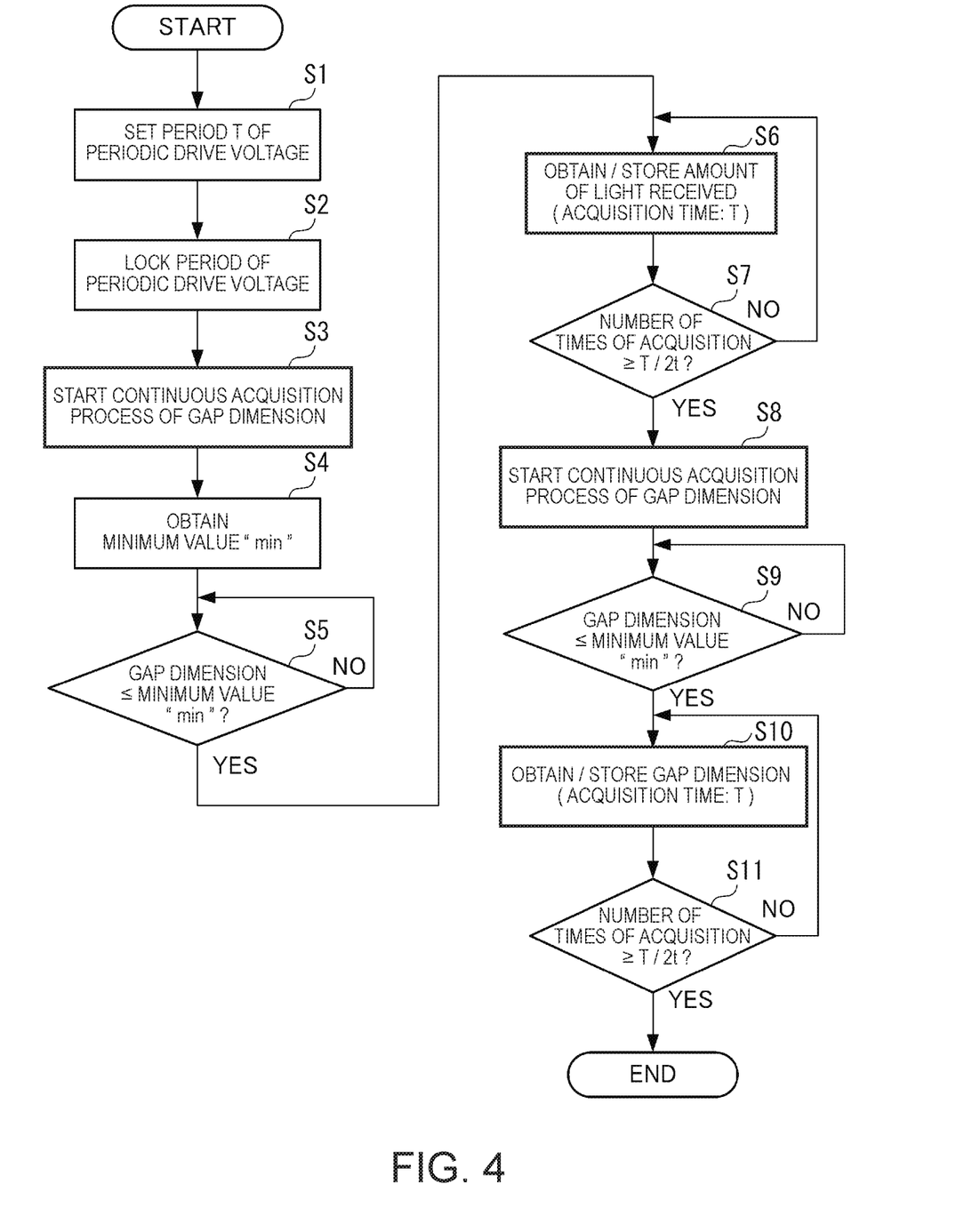
FIG. 4 is a flowchart showing a method for driving the optical device according to the embodiment.

FIG. 4 is a flowchart showing a method of driving the optical device 1 according to the present embodiment.

As shown in FIG. 4, in the optical device 1, in the case of performing spectroscopic measurement on the measurement object, the voltage control section 21 firstly sets (step S1) the period T of the periodic drive voltage for driving the resonance of the variable wavelength interference filter 5.

Specifically, in order to set the period T, the voltage control section 21 retrieves the characteristic period of the movable section 521 from the storage section 30. Then, the voltage control section 21 controls the filter drive circuit 16 to sequentially vary the period of the periodic drive voltage at predetermined time intervals within a range no lower than 80% and no higher than 120% of the characteristic period, and apply the periodic drive voltage to the electrostatic actuator 56. For example, the voltage control section 21 varies the period in sequence from the side near to the characteristic period at intervals of 1 kHz. Further, in the present embodiment, the voltage value of the periodic drive voltage is set to no higher than 5 V.

Further, the signal acquisition section 22 controls the gap detection circuit 15 to obtain the gap dimension of the inter-reflecting film gap Gm with a sampling period set in advance.

Then, the voltage control section 21 determines whether or not a local minimum value of the same gap dimension has been obtained (detected) a predetermined number of times or more in a predetermined period of time every time the voltage control section 21 changes the period of the periodic drive voltage. In the case in which the local minimum value of the same gap dimension is obtained the predetermined number of times or more, the movable section 521 is driven to resonate, and it is possible to determine that the local minimum value of the gap dimension has become the minimum value (the value no greater than a second value). Therefore, to determine whether or not the local minimum value of the same gap dimension has been obtained the predetermined number of times or more is to determine whether or not the minimum value of the gap dimension has been obtained (detected) the predetermined number of times or more. It should be noted that the predetermined number of times is set to, for example, 2 times in the present embodiment.

Further, in the case in which the local minimum value has been obtained the predetermined number of times or more, the voltage control section 21 determines that the movable section 521 is driven to resonate, and the period of the periodic drive voltage set at that moment is set to the period T.

Then, the voltage control section 21 locks (step S2) the period of the periodic drive voltage at the period T.

It should be noted that in the present embodiment, the voltage control section 21 determines whether or not the local minimum value of the same gap dimension has been obtained the plurality of number of times or more to thereby determine whether or not the movable section 521 is driven to resonate, but this is not limiting. For example, it is also possible for the voltage control section 21 to determine whether or not the local maximum value of the same gap dimension has been obtained a predetermined number of times or more, namely whether or not the maximum value (a value not smaller than a first value larger than the second value) of the gap dimension has been obtained the predetermined number of times or more, to thereby determine whether or not the movable section 521 is driven to resonate.

Figure 5:
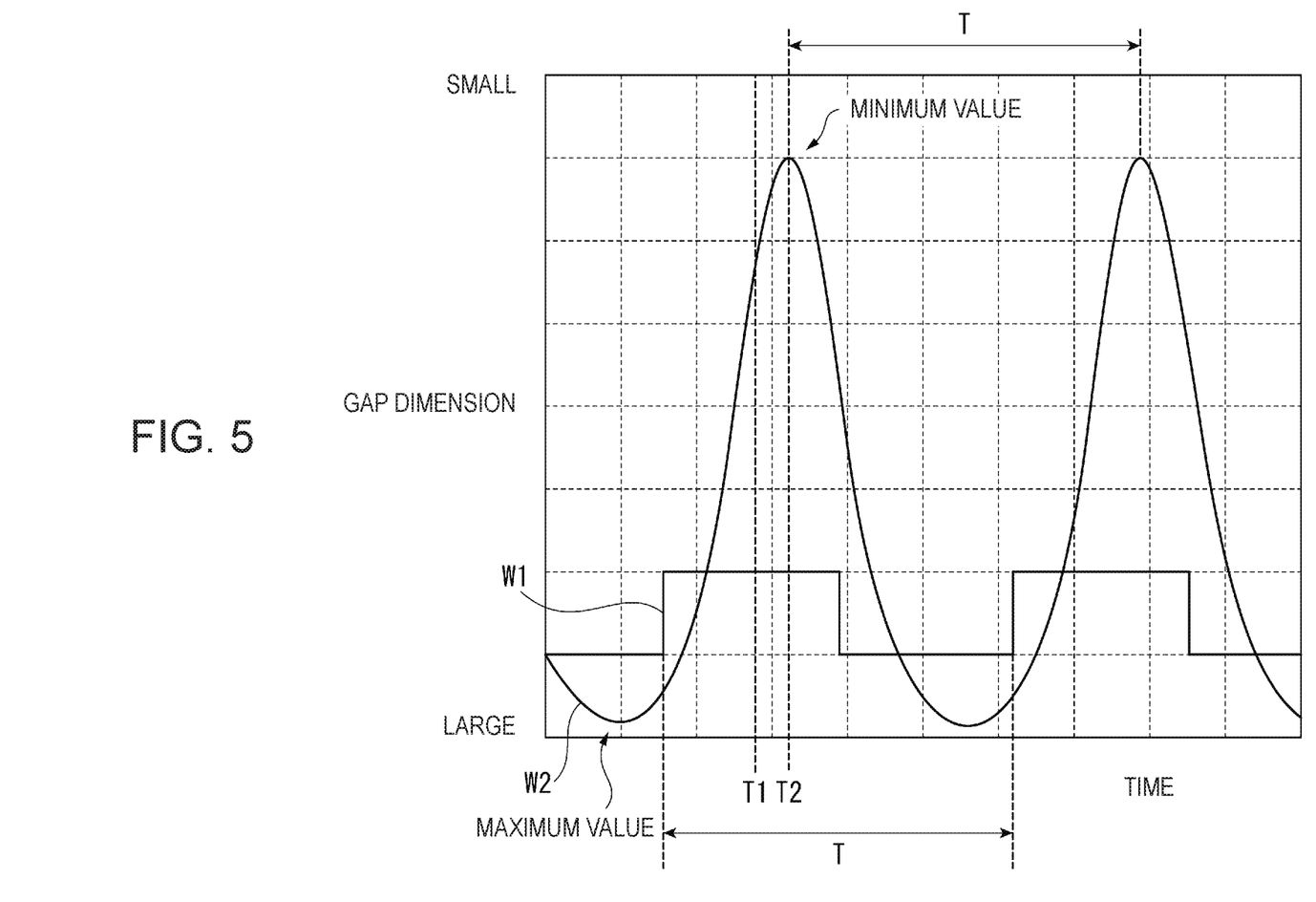
FIG. 5 is a waveform chart showing a variation of a periodic drive voltage and a gap dimension of the embodiment.

Since the period of the periodic drive voltage is locked at the period T in the step S2, the filter drive circuit applies the periodic drive voltage with the period T represented by the waveform W1 shown in FIG. 5 continuously to the electrostatic actuator 56. It should be noted that the waveform W1 is a waveform of a rectangular wave in the present embodiment, but can also be a waveform of a sine wave or a triangular wave.

Thus, the movable section 521 is driven to resonate, and the gap dimension varies periodically with the period T as represented by the waveform W2 shown in FIG. 5. It should be noted that the movable section 521 is driven to resonate, and is thus displaced not only in the direction of coming closer to the stationary reflecting film 54, but also in the direction of getting away from the stationary reflecting film 54 with respect to the initial position before applying the voltage to the electrostatic actuator 56.

Here, as shown in FIG. 5, there is a time lag between the timing T1 (a midpoint of the pulse) at which the periodic drive voltage is applied and the timing T2 at which the gap dimension takes the minimum value, and the waveform W1 and the waveform W2 are shifted in phase from each other.

In the present embodiment, since the light reception signal is obtained at the sampling timing based on the timing at which the gap dimension takes the minimum value, the timing at which the gap dimension takes the minimum value is detected by measurement before obtaining the light reception signal.

Specifically, the signal acquisition section 22 controls the gap detection circuit 15 to start (step S3) the process for obtaining the gap dimension with the sampling period set in advance.

Further, the signal acquisition section 22 obtains the gap dimension for the period T, and then obtains (step S4) the minimum value of the gap dimension thus obtained as the minimum value "min."

Then, the signal acquisition section 22 determines (step S5) whether or not the gap dimension obtained thereafter is equal to or smaller than the minimum value "min" obtained in the step S4. The signal acquisition section 22 repeatedly performs the determination process of the step S5 every time the signal acquisition section 22 obtains the gap dimension until the signal acquisition section 22 determines that the gap dimension thus obtained is equal to or smaller than the minimum value "min."

Then, in the case in which YES has been determined in the step S5, it can be determined that the timing at which the gap dimension takes the minimum value has come. Therefore, the signal acquisition section 22 terminates the process of obtaining the gap dimension, and then controls the signal processing circuit 13 to perform the process of obtaining the light reception signal output from the light receiver 11 with the predetermined sampling period (at the predetermined sampling timings) until the timing at which the gap dimension takes the maximum value.

Specifically, the signal acquisition section 22 starts counting the number of times of the acquisition of the light reception signal, and at the same time, obtains the light reception signals output from the light receiver 11 for the acquisition time t to obtain the amount of light received. Then, the signal acquisition section 22 stores (step S6) the amount of light received thus obtained in the storage section 30 so as to be associated with the number of times of acquisition (the count value). Here, the sampling period (the acquisition time t) is set to a value obtained by dividing a period half as long as the period T as the sampling period by a number of times of sampling set in advance. According to the above, it is possible to make the number of times of sampling constant irrespective of the value of the period T, and at the same time, it is possible to obtain the amount of light received at the timing at which the gap dimension takes the maximum value.

Then, the signal acquisition section 22 determines (step S7) whether or not the number of times of acquisition of the light reception signal is equal to or greater than T/2t. In the case in which NO has been determined in the step S7, it can be determined that the timing at which the gap dimension takes the maximum value has not been reached, and therefore, the signal acquisition section 22 returns the process to the step S6 to perform the acquisition process of the light reception signal once again. In other words, the acquisition process of the step S6 is continuously repeated until the number of times of acquisition becomes equal to or larger than T/2t.

In the case in which YES has been determined in the step S7, it can be determined that the movable section 521 has been driven for a half of the period, and the displacement from the state in which the gap dimension takes the minimum value to the state in which the gap dimension takes the maximum value has been made. Therefore, the signal acquisition section 22 terminates the acquisition process of the light reception signal.

Then, the optical device 1 performs the process of obtaining the gap dimension corresponding to the light reception signal thus obtained. In the present embodiment, similarly to the acquisition of the light reception signal, firstly, the timing at which the gap dimension takes the minimum value is detected, and then, the gap dimension is obtained at the sampling timings based on the timing thus detected.

Firstly, the signal acquisition section 22 controls the gap detection circuit 15 to start (step S8) the process for obtaining the gap dimension with the sampling period set in advance.

Then, the signal acquisition section 22 determines (step S9) whether or not the gap dimension having been obtained is equal to or smaller than the minimum value "min" obtained in the step S4. The signal acquisition section 22 repeatedly performs the determination process of the step S9 every time the signal acquisition section 22 obtains the gap dimension until the signal acquisition section 22 determines that the gap dimension thus obtained is equal to or smaller than the minimum value.

Further, in the case in which YES has been determined in the step S9, it can be determined that the timing at which the gap dimension takes the minimum value has come. Therefore, the signal acquisition section 22 starts counting the number of times of acquisition of the gap dimension, and at the same time, and obtains the detection signal output from the gap detection circuit 15 for the acquisition time t to obtain the gap dimension. In other words, the signal acquisition section 22 obtains the gap dimension with the same sampling period as in the acquisition of the light reception signal. Then, the signal acquisition section 22 stores (step S10) the gap dimension thus obtained in the storage section 30 so as to be associated with the number of times of acquisition (the count value).

Then, the signal acquisition section 22 determines (step S11) whether or not the number of times of acquisition of the gap dimension is equal to or greater than T/2t. In the case in which NO has been determined in the step S11, it can be determined that the timing at which the gap dimension takes the maximum value has not been reached, and therefore, the signal acquisition section 22 returns the process to the step S10 to perform the acquisition process of the gap dimension once again. In other words, the acquisition process of the step S10 is continuously repeated until the number of times of acquisition becomes equal to or larger than T/2t.

In the case in which YES has been determined in the step S11, it can be determined that the variable wavelength interference filter 5 has been driven for a half of the period, and the displacement from the state in which the gap dimension takes the minimum value to the state in which the gap dimension takes the maximum value has been made. Therefore, the signal acquisition section 22 terminates the acquisition process of the gap dimension.

In the manner described hereinabove, the measurement is performed.

According to the above, the storage section 30 stores the amount of light received and the gap dimension so as to be associated with the number of times of acquisition (the count value) counted from the timing at which the gap dimension takes the minimum value. It can be determined that the amount of light received and the gap dimension associated with the same number of times of acquisition are the amount of light received and the gap dimension measured in the case in which the movable section 521 in vibration is in the same phase. Therefore, it is possible for the control circuit 20 to obtain the amount of light received with respect to each of the gap dimensions from the information stored in the storage section 30. In other words, the amount of light received with respect to each wavelength can be obtained.

Functions and Advantages of Embodiment

According to the present embodiment, when performing the measurement, the movable section 521 of the variable wavelength interference filter 5 is driven to resonate.

In this case, since the movable section 521 can be displaced using not only the force generated by the electrostatic actuator 56 but also the restoring force for biasing the movable section 521 thus displaced to return to the initial position, the gap dimension can be varied within the predetermined range with a lower voltage compared to the case of displacing the movable section 521 only with the force generated by the electrostatic actuator 56.

Further, since the movable section 521 is displaced not only in the direction of coming closer to the stationary reflecting film 54, but also in the direction of moving away from the stationary reflecting film 54, the amount of displacement from the initial position can be made smaller compared to the case of making the displacement only in the direction of coming closer to the stationary reflecting film 54. From this aspect, the voltage to be applied to the electrostatic actuator 56 can be made lower.

Specifically, for example, in the configuration in which the voltage is varied in a stepwise manner and is applied to the electrostatic actuator 56 to thereby vary the gap dimension of the inter-reflecting film gap Gm in a stepwise manner, the restoring force of the movable section 521 cannot be used, and further, the movable section 521 is displaced only in the direction of coming closer to the stationary reflecting film 54. Therefore, according to the present embodiment, the voltage to be applied to the electrostatic actuator 56 can dramatically be lowered compared to such a configuration.

Thus, according to the present embodiment, the light intensity of the light with each wavelength can be detected with a low voltage, and thus, the current consumption and the power consumption can be reduced. Therefore, it is possible to install the optical device 1 also in battery-powered mobile equipment.

In the light receiver 11, the signal processing circuit 13, the A/D converter 14, the gap detection circuit 15, the control circuit 20 and so on constituting the optical device 1, there is used a voltage equal to or lower than 5 V. In the present embodiment, since the voltage value of the periodic drive voltage is equal to or lower than 5 V, the voltage used in the circuits described above can be used as the periodic drive voltage without being stepped up. Specifically, it is possible to operate the filter drive circuit 16 with the voltage equal to or lower than 5 V. Therefore, there is no need to provide a step-up circuit or the like, and therefore, the size reduction or the thickness reduction of the optical device 1 can be achieved. Further, the circuit configuration of the optical device 1 can be simplified.

According to the present embodiment, the period T of the periodic drive voltage for driving the movable section 521 to resonate can be set based on the actual measured value. Therefore, even in the case in which the characteristic period of the movable section 521 varies in accordance with, for example, the usage environment, it is possible to drive the movable section 521 to resonate with accuracy.

Further, since the search range when setting the period T is 80% through 120% of the characteristic period of the movable section 521, it is possible to prevent searching from the period low in probability that the movable section 521 can be driven to resonate. Therefore, the average time necessary for the search of the period can be reduced.

MODIFIED EXAMPLES

It should be noted that the invention is not limited to the embodiment described above, but includes modifications, improvements, and so on within a range where the advantages of the invention can be achieved.

In the embodiment described above, after the movable section 521 is driven to resonate, the signal acquisition section 22 obtains the amount of light received in the period from the timing at which the gap dimension of the inter-reflecting film gap Gm takes the minimum value to the timing at which the gap dimension takes the maximum value, and then obtains the gap dimension in the period from the timing at which the gap dimension subsequently takes the minimum value to the timing at which the gap dimension takes the maximum value, but the scope of the invention is not limited thereto.

For example, it is also possible for the signal acquisition section 22 to alternately obtain the amount of light received and the gap dimension in the common period from the timing at which the gap dimension takes the minimum value to the timing at which the gap dimension takes the maximum value. In this case, since the acquisition timing of the amount of light received and the acquisition timing of the gap dimension are shifted from each other, for example, the amount of light received is stored in the storage section 30 so as to be associated with the average value of the gap dimension obtained around the timing at which the amount of light received is obtained.

It should be noted that in this case, in the case in which the processing rate of the A/D converter 14 is the same, the number of times of acquisition of the amount of light received and the gap dimension becomes smaller compared to the embodiment described above. In this case, the wavelength intervals (measurement wavelength intervals) of the wavelength with which the amount of light received can be measured becomes longer, and thus, the resolution is lowered. Therefore, it is preferable to adopt the configuration in which the signal acquisition section 22 continuously obtains the amount of light received, and then continuously obtains the gap dimension as in the embodiment described above.

Further, it is also possible to obtain the gap dimension in advance of the acquisition of the amount of light received.

Further, it is also possible to provide, for example, two A/D converters to make it possible to obtain the amount of light received and the gap dimension at the same time.

In the embodiment described above and the modified example described above, the signal acquisition section 22 obtains the amount of light received and the gap dimension for the period from the timing at which the gap dimension of the inter-reflecting film gap Gm takes the minimum value to the timing at which the gap dimension takes the maximum value, but the scope of the invention is not limited thereto.

For example, it is also possible for the signal acquisition section 22 to detect the timing at which the gap dimension takes the maximum value, and then obtain the amount of light received and the gap dimension in the period from that timing to the timing at which the gap dimension takes the minimum value.

Further, it is also possible for the signal acquisition section 22 to obtain the amount of light received and the gap dimension in the period from the timing at which the gap dimension takes the minimum value to the timing at which the gap dimension subsequently takes the minimum value, namely during the period T. Further, it is also possible for the signal acquisition section 22 to obtain the amount of light received and the gap dimension in the period from the timing at which the gap dimension takes the maximum value to the timing at which the gap dimension subsequently takes the maximum value.

Further, it is also possible to obtain a periodic function representing the displacement of the gap dimension in the resonance by calculation based on the period T, and the minimum value and the maximum value of the gap dimension to thereby obtain the gap dimension when obtaining the amount of light received based on the periodic function. In this case, since there is no need to obtain the gap dimension by measurement, the measurement time can be reduced.

In the embodiment described above and the modified examples described above, the voltage value of the periodic drive voltage is set to not higher than 5 V, but this is not limiting. In other words, the voltage value of the periodic drive voltage can be a value higher than 5 V.

In the embodiment described above and the modified examples described above, when setting the period T, there is searched the range from 80% through 120% with respect to the characteristic period of the variable wavelength interference filter 5, but the scope of the invention is not limited thereto. For example, it is also possible to search a broader range or a narrower range. Alternatively, it is also possible to set the characteristic period of the variable wavelength interference filter 5 directly to the period T without performing the search of the period.

In the embodiment described above and the modified examples described above, when searching for the period to be set to the period T, the period of the periodic drive voltage is varied from the side close to the characteristic period of the variable wavelength interference filter 5 in sequence with the intervals of 1 kHz, but the scope of the invention is not limited thereto.

For example, in the search range (the range from 80% through 120% of the characteristic period), the period of the periodic drive signal is varied with first intervals (e.g., intervals of 1 kHz) to detect the period for making the gap dimension the smallest or the largest. Subsequently, it is also possible to vary the period of the periodic drive voltage at second intervals (e.g., 0.1 kHz) finer than the first intervals in a predetermined period range including the period corresponding to the smallest gap dimension or the largest gap dimension to detect the period for making the gap dimension the smallest or the largest, and then set the period thus detected to the period T.

According to this configuration, it is possible to accurately detect the period with which the variable wavelength interference filter can be driven to resonate. Further, the search time can be reduced compared to the case of, for example, varying the period of the periodic drive voltage at the second intervals from the beginning to perform the search.

In the embodiment described above and the modified examples described above, as the variable wavelength interference filter 5, there is illustrated a light transmissive type variable wavelength interference filter for transmitting the light with the wavelength corresponding to the gap dimension of the inter-reflecting film gap Gm out of the incident light, but the scope of the invention is not limited thereto. For example, it is also possible to use a light reflective type variable wavelength interference filter for reflecting the light with the wavelength corresponding to the gap dimension. Further, it is also possible to use other types of variable wavelength interference filters.

Besides the above, a specific configuration to be adopted when implementing the invention can arbitrarily be modified into another configuration and so on within the range in which the advantages of the invention can be achieved.

The entire disclosure of Japanese Patent Application No. 2017-063020 filed Mar. 28, 2017 is expressly incorporated herein by reference.

What is claimed is:

1. An optical module comprising:
a variable wavelength interference filter including:
   a pair of reflecting films; and
   an electrostatic actuator configured to change a gap dimension between the pair of reflecting films;
a driver configured to apply a periodic drive voltage to the electrostatic actuator;
a gap detector configured to detect the gap dimension between the pair of reflecting films;
a light receiver configured to receive light from the variable wavelength interference filter and output a light reception signal;
a signal acquirer configured to detect the light reception signal from the light receiver, the signal acquirer detecting the light reception signal when one of a maximum value of the gap dimension is detected by the gap detector or when a minimum value of the gap dimension is detected by the gap detector; and
a control circuit including a memory;
wherein the driver is in communication with the control circuit;
the gap detector is in communication with the control circuit;
the light receiver is in communication with the control circuit; and
the signal acquirer is in communication with the light receiver, and configured to detect the light reception signal from the light receiver,
the variable wavelength interference filter includes a movable substrate that has a movable section, and
the control circuit maintains a characteristic period of the movable section in the memory, and is configured to instruct the driver to vary the period of the periodic drive voltage in a range from 80% to 120% with respect to the characteristic period of the movable section, and then lock the period when the gap detector detects one of:
the maximum value of the gap dimension a predetermined number of times; or
the minimum value of the gap dimension a predetermined number of times.

2. The optical module according to claim 1, wherein a voltage value of the periodic drive voltage is less than or equal to 5 V.

3. The optical module according to claim 1, wherein the driver is configured to apply the periodic drive voltage based on a characteristic period of the movable section.

4. The optical module according to claim 1, wherein the driver is configured to apply the periodic drive voltage based on the characteristic period of the movable section, and is configured to lock the period of the periodic drive voltage when the gap detector detects one of:
the maximum value that is greater than or equal to a first value; or
the minimum value that is less than or equal to a second value for a predetermined number of times.

5. The optical module according to claim 1, wherein the signal acquirer is configured to obtain the gap dimension corresponding to the light reception signal and detected by the gap detector.

6. The optical module according to claim 5, wherein the signal acquirer is configured to continuously obtain the light reception signal, and then to continuously obtain the gap dimension.

7. The optical module according to claim 1, wherein a voltage waveform of the periodic drive voltage is a rectangular wave.

8. A method of driving an optical module including a variable wavelength interference filter, the method comprising:
applying a periodic drive voltage to an electrostatic actuator with a driver; and
detecting a light reception signal from a light receiver with a signal acquirer when one of a maximum value of a gap dimension between a pair of reflecting films of the variable wavelength interference filter is detected by a gap detector, or when a minimum value of the gap dimension is detected by the gap detector,
wherein the driver is in communication with a control circuit having a memory;
the gap detector is in communication with the control circuit;
the light receiver is in communication with the control circuit; and
the signal acquirer is in communication with the light receiver, and configured to detect the light reception signal from the light receiver,
the variable wavelength interference filter includes a movable substrate that has a movable section, and
the control circuit maintains a characteristic period of the movable section in the memory, and is configured to instruct the driver to vary the period of the periodic drive voltage in a range from 80% to 120% with respect to the characteristic period of the movable section, and then lock the period when the gap detector detects one of:
the maximum value of the gap dimension a predetermined number of times; or
the minimum value of the gap dimension a predetermined number of times.

9. A method of driving an optical module including a variable wavelength interference filter having a pair of reflecting films and an electrostatic actuator that selectively changes a gap dimension between the pair of reflecting films, the method comprising:
applying a periodic drive voltage to the electrostatic actuator with a driver;
detecting the gap dimension between the pair of reflecting films with a gap detector;
receiving light from the variable wavelength interference filter with a light receiver and outputting a light reception signal; and
detecting the light reception signal with a signal acquirer when one of a maximum value of the gap dimension is detected or when a minimum value of the gap dimension is detected,
wherein the driver is in communication with a control circuit having a memory;
the gap detector is in communication with the control circuit;
the light receiver is in communication with the control circuit; and the signal acquirer is in communication with the light receiver, and configured to detect the light reception signal from the light receiver, the variable wavelength interference filter includes a movable substrate that has a movable section, and the control circuit maintains a characteristic period of the movable section in the memory, and is configured to instruct the driver to vary the period of the periodic drive voltage in a range from 80% to 120% with respect to the characteristic period of the movable section, and then lock the period when the gap detector detects one of:

the maximum value of the gap dimension a predetermined number of times; or the minimum value of the gap dimension a predetermined number of times.

10. The method according to claim 9, wherein a voltage value of the periodic drive voltage is less than or equal to 5 V.

11. The method according to claim 9, further comprising:

setting the period of the periodic drive voltage based on the characteristic period of the movable section of a movable substrate of the interference filter.

12. The method according to claim 9, further comprising:

varying the period of the periodic drive voltage based on the characteristic period of the movable section of the movable substrate of the interference filter, and then locking the period when one of:

the maximum value that is greater than or equal to a first value; or the minimum value that is less than or equal to a second value is detected in a predetermined number of times.

13. The method according to claim 9, wherein the gap dimension corresponds to the light reception signal and the detected gap.

14. The method according to claim 13, further comprising:

continuously obtaining the light reception signal, and then continuously obtaining the gap dimension.

15. The method according to claim 9, wherein a voltage waveform of the periodic drive voltage is a rectangular wave.

* * * * *